(12) United States Patent
Cramer

(10) Patent No.: US 6,677,075 B2
(45) Date of Patent: Jan. 13, 2004

(54) PLUG ARRANGEMENT FOR A CELL VENT OF A STORAGE BATTERY

(75) Inventor: Wilhelm Cramer, Brilon-Messinghausen (DE)

(73) Assignee: Accumulatorenwerke Hoppecke Carl Zoellner & Sohn GmbH & Co. KG (DE)

( * ) Notice: Subject to any disclaimer, the term of this patent is extended or adjusted under 35 U.S.C. 154(b) by 296 days.

(21) Appl. No.: 09/855,884

(22) Filed: May 15, 2001

(65) Prior Publication Data

US 2001/0041286 A1 Nov. 15, 2001

(30) Foreign Application Priority Data

May 15, 2000 (DE) .......................... 100 23 747

(51) Int. Cl.[7] ............................ H01M 2/12; H01M 2/04
(52) U.S. Cl. ...................................................... 429/89
(58) Field of Search ................................ 429/7, 88, 89

(56) References Cited

U.S. PATENT DOCUMENTS 4,600,664 A * 7/1986 Cramer .......................... 429/7
5,380,604 A * 1/1995 Hampe ......................... 429/84
5,561,001 A * 10/1996 Gurtler ......................... 429/86

FOREIGN PATENT DOCUMENTS

| EP | 1156583 A2 | * 11/2001 | ............ H01M/2/12 |
| GB | 2069747 | * 8/1981 | ............ H01M/2/12 |

* cited by examiner

*Primary Examiner*—Mark Ruthkosky
(74) *Attorney, Agent, or Firm*—Cantor Colburn LLP

(57) ABSTRACT

The invention concerns a plug arrangement for gas-tight closure of a cell vent of a storage battery. To provide a plug arrangement that to the greatest possible extent prevents acid from running out when a storage battery is tipped or turned and at the same time permits sufficient degassing and can also be produced economically, is easy to install and can be adjusted to different battery designs, this invention purposes a plug arrangement for gas-tight closure of a cell vent of a storage battery including a plug that can be used for a seal in the cell vent, an inside of the cell is connected by fluid mechanics to a hollow space made between upper and lower covers of a housing cover for acid deposition through a plug vent in a generating surface of the plug that has a two-way sealed membrane.

14 Claims, 2 Drawing Sheets

PLUG ARRANGEMENT FOR A CELL VENT OF A STORAGE BATTERY

FIELD OF THE INVENTION

The invention concerns a plug arrangement for making a gas-tight seal on a vent in a storage battery cell composed of a plug that can be used to seal a cell vent.

DESCRIPTION OF THE RELATED ART

Storage batteries are known from the state of the art. They are comprised of different electrodes which, if the storage battery is designed to be multi-cell, are assembled into individual cells and placed in a housing. The housing is closed with a cover on top. The housing cover most often consists of a upper cover and a lower cover, whereby a hollow space for acid deposition is designed between the upper and lower covers. This type of storage battery was described in EP 0 584 528 B1, for example.

In the lead storage batteries generally used for motor vehicles, the electrodes are composed of lead and are designed in the shape of a grid, whereby the mesh of the grid is filled with lead oxide on the positive side and so-called lead sludge on the negative side. Sulfuric acid is generally used as the electrode and can be used either in liquid form or in a type of gel in concentrated form. In the charging process, there are chemical reactions in the electrolytes that also result in the development of gases, inter alia. To counteract an uncontrolled build-up of pressure in the storage battery housing and, in the worst case, an explosive gas release, the storage battery has gas outlet vents to let out the gas. They are most often designed in the cover area.

There are two basic ways of letting out gas known from the state of the art for discharging easily combustible gases that are produced, for example during electrolyte evaporation as a result of charging. For one, the gas can be taken away by discharging it directly through the plugs that close the individual cell vents into the air surrounding the storage battery. Such gas discharge is known from EP 0 756 338, for example. For another, the gas can be discharged through a central degassing line. In this variation of gas discharge, the individual cells of the storage battery are connected to one another via a common, degassing line that is most often built into the battery cover and runs transverse to the cells. Gases to be discharged are let out through the degassing line, most often on the top of the housing cover from the storage battery cover and discharged into the atmosphere. This last degassing variation is known, inter alia, from EP 0 305 822 A1 and U.S. Pat. No. 5,561,001. In both degassing variations just mentioned, the gases to be discharged go through a porous filter disk, the so-called frit, before they go out of the storage battery. It is used, especially, to prevent backflashes of easily combustible gases back inside the storage battery.

If the storage battery is not handled properly or if it is moved out of its normal position as a result of some assembly step that proves necessary and is twisted or tipped, acid will come out of the storage battery cells and run into the hollow space in the housing cover. This is naturally unwanted, and acid, which comes out of the storage battery housing at correspondingly high inner pressure through the degassing vent, is pushed to the outside. This situation is especially adverse when storage batteries used as starter batteries for motor vehicles are moved out of their normal position by twisting or tipping after final assembly for installation in the motor vehicle and as a result of this situation, acid comes out of the battery cells.

SUMMARY OF THE INVENTION

The object of the invention is therefore to prevent the above-mentioned disadvantages by providing a plug arrangement that permits sufficient degassing and at the same time to the greatest possible extent prevents acid from running out when the storage battery is tipped or turned. The plug arrangement should also be economical to produce, easy to mount and able to fit batteries with different structural designs.

To accomplish the object, the invention proposes a plug arrangement for gas-tight closing of a cell vent of a storage battery, composed of a plug that can be used to seal the cell vent, whereby the inside of the cell is connected by fluid mechanics to a hollow space designed between the upper and lower cover of the housing cover for acid deposition through a vent provided with a two-way sealed membrane in the generating surface of the plug.

A storage battery with the plug arrangement in the invention is largely insensitive to acid running out when there are turning or tipping motions. The vent in the generating surface of the plug, which is provided with a sealed membrane, makes it possible to let the gas out of the battery cells, but it effectively prevents unwanted acid from running out of the inside of the cells and running into the hollow space in the housing cover during improper handling or as a result of the battery being tipped during assembly. The two-way sealed membrane thus permits a slow reflux of acid in the event that, because of excess inner pressure—for example if there is overcharging, during the degassing process—acid gets out of the cell and goes into the hollow space in the housing cover. The acid that then collects in the hollow space can go through the sealed membrane in the opposite direction and flow through the vent in the generating surface of the plug back inside the cell.

The design in the invention has the advantage of making sure that acid itself cannot flow out of the storage battery when that is not wanted, if it is tipped or turned out of its normal position. This is a special advantage in the installation of storage batteries used as starter batteries for motor vehicles. Thus, using fully automated assembly plants, the respective storage batteries are installed in the motor vehicles without having to prevent them from being turned or tipped. This ensures that acid does not flow out of the storage battery regardless of the angle at which the storage batteries are turned or tipped when moved for correct positioning and installation.

One feature of the invention is that the sealed membrane has a break-out, at least in one place, forming a vent. This has the advantage of guaranteeing, on one hand, that gas can come out of the inside of the cells unhindered during the degassing process, but, on the other hand, acid in the hollow space in the housing cover can go back inside the cell again. So both acid deposited in the hollow space and acid that penetrates the hollow space unwanted as a result of the battery turning or tipping is fed back inside the cells. The gap-like design of the break-out has turned out to be a special advantage here.

In an alternative proposal, the sealed membrane is made out of two flexible partial membranes set on one side. This type of design also has the advantage of making it possible both for gas to get out and for acid that collects in the hollow space to be fed back. Another feature of the invention is that the partial membrane is arranged so it can swivel in the direction of the hollow space. This arrangement advantageously supports degassing working in the direction of the hollow space. The gaps formed based on the two-piece arrangement of the partial membranes in this alternative also permit a slow reflux of acid that collects in the hollow space. The flexible design of the partial membranes also prevents particles that dissolve in the cell from running into the vent closed by the sealed membrane, so that the gas can be safely discharged from the storage battery under all operating conditions.

Another feature of the invention is that the vent designed in the generating surface of the plug is arranged opposite the access to the hollow space on the plug used in the cell vent. This measure ensures that a ready-to-use storage battery has vents made in the plugs that are positioned in such a way that on one hand, unhindered degassing and, on the other hand, possible acid reflux can take place. Another special advantage of the invention is the lower edge of the vent in the generating surface of the plug is arranged under the lower edge of the vent in the access to the hollow space. This makes it so that both the acid that flowed into the hollow space and the condensate formed in the hollow space collects directly in front of the sluice-like sealed membrane and flow back inside the cell again. This therefore prevents residues in the hollow space.

Another feature of the invention is that the plug likewise has a rotating seal on the head, which on a plug used in the cell vent in the area near the upper cover bears down on the wall surrounding the cell vent and seals the hollow space opposite the atmosphere surrounding the storage battery. This prevents uncontrolled outflow of gases or liquids in the hollow space into the atmosphere surrounding the storage battery. In the reverse flow direction, penetration of fluids into the inside of the storage battery is also prevented. One special advantage of the invention is that the rotating seal is a round seal, preferably an O ring.

Another feature of the invention is that the plug also has a rotating seal on the foot, which bears down on and seals the wall surrounding the cell vent, on a plug used in the cell vent, in the area near the lower cover and seals the hollow space opposite the inside of the cells. The rotating seal is preferably designed as a laminar seal. The advantage of a laminar seal is that tolerances between the cell vents on the lower and upper cover can be equalized, so that when the lower and upper cover are put together, a center offset makes tolerance equalization possible. Sealing the inside of the cell opposite the hollow space prevents an uncontrolled influx of electrolytes from inside the cells out into the hollow space. The result of sealing the plug on the head and the foot is that degassing takes place only through the vent in the generating surface of the plug provided for it. In the invention, the two-way sealed membrane makes sure that reflux of condensate and/or acid that runs into the hollow space is possible as well as degassing of the inside of the cells.

Another feature of the invention is that both the round seal and also the laminar seal are molded in one piece on the plug. This makes the plub simple and especially economical to produce. In another very advantageous proposal in the invention, the sealed membrane is also molded in one piece on the plug, and the round and laminar seal, as well as the sealed membrane, are designed in a two-component process by means of injection molding in a single process step. A plug produced in the above-mentioned way can be varied by slight modifications in shape and size, so that using the modular principle, different plugs can be produced to fit different storage battery designs.

BRIEF DESCRIPTION OF THE DRAWINGS

The following description gives other features and advantages of the invention using the accompanying drawings.

DETAILED DESCRIPTION OF THE PREFERRED EMBODIMENT

Figure 1:
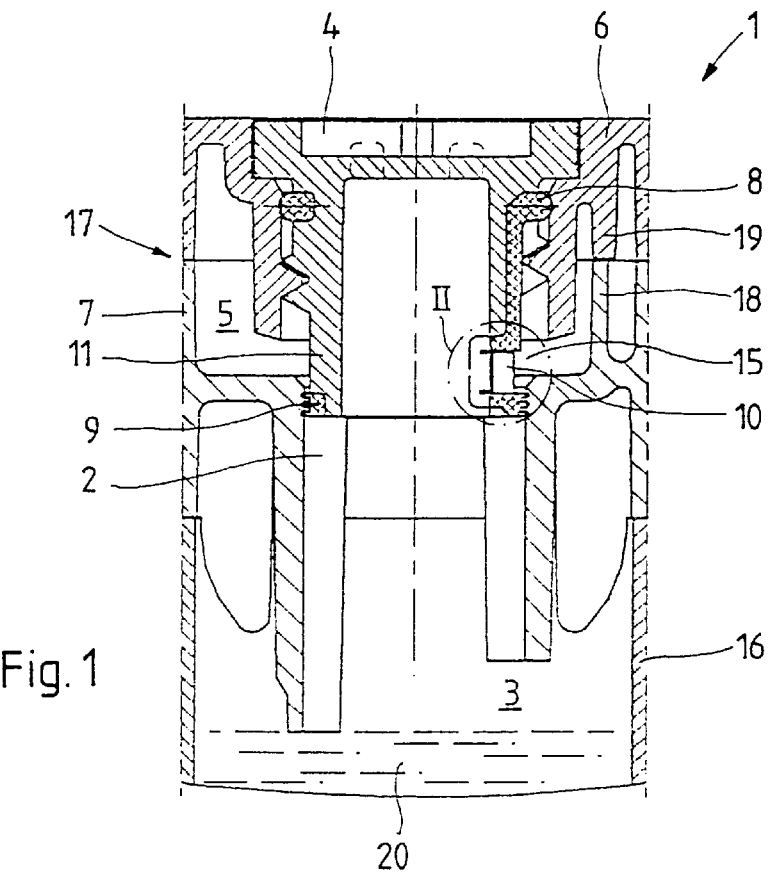
FIG. 1 shows a sectional partial side view of the plug arrangement in the invention.

FIG. 1 shows a sectional partial side view of the plug arrangement 1 in the invention. The housing 16, which opens up, is closed with a cover 17. The cover 17 is, in turn, comprised of a lower cover 7 and a corresponding upper cover 6. FIG. 1 shows only the area over one of the cells 3. The lower cover 7 has webs 18 pointing up. The upper cover 6 is designed to correspond to it and has webs 19 pointing down, which are connected tightly to the webs 18 of the lower cover 7. This can be done by adhesion, for example. Webs 18 and 19 define a labyrinth branch in the hollow space 5 of the cover 17, forming a degassing line.

The cover 17 has a cell vent 2. The cell vent 2 is closed with a plug 4. For this purpose, the cell vent 2 is provided with an inside thread and the plug 4 with an outside thread corresponding to it.

To seal the plug 4 opposite the upper cover 6, a round seal 8 is provided, which bears down on the upper cover 6 and seals it when the plug is screwed in. The hollow space 5 opposite the atmosphere surrounding the storage battery is sealed with the round seal 8, which is preferably designed as an O ring. On the foot, the plug 4 has a rotating laminar seal 9. The laminar seal 9 bears down on the wall surrounding the cell vent 2 and seals it in the area of the lower cover 7 and seals the hollow space 5 opposite the inside of the cells 3.

Directly above the laminar seal 9, the generating surface 11 of the plug 4 is provided with a vent 10. When the plug 4 is screwed in, this vent 10 is directly opposite the access 15 to the hollow space, whereby the lower edge of the vent 10 is arranged somewhat below the lower edge of the access 15 to the hollow space. Over the vent 10 made in the generating surface 11 of the plug 4, the inside 3 of the cell is directly connected by fluid mechanics to the hollow space 5 made in the cover 17. The vent 10 thus permits degassing of the cell 3. To prevent acid 20 from flowing uncontrolled through the vent 10 into the hollow space 5 of the cover 17 when the storage battery is tipped or turned, the vent 10 is closed with a sealed membrane 12.

The sealed membrane 12 is designed to be two-way. For one thing, this ensures the degassing of the cell; for another, the acid mist deposited in the hollow space 5 can go back inside the cell 3 through the vent 10. Even in the event that acid is pressed out of the inside of the cell 3 into the hollow space by correspondingly high pressure, reflux is possible. The plug arrangement in the invention also makes sure that acid from the storage battery housing itself does not run out even when the storage battery is turned or tipped out of its normal position.

In one preferred embodiment, the sealed membrane 12 is made of two flexible partial membranes 13 set on one side forming several gaps 14. The partial membranes 13 are arranged so they can swivel in the direction of the hollow space 5. This has the advantage of supporting the degassing of the cell 3, so that the acid mist in the hollow space 5 of the cover 17 can be deposited, whereby the gaps 14 allow acid in the hollow space 5 to flow back inside the cells 3. Likewise, the sealed membrane 12 prevents the acid 20 inside the cells 3 from flowing out into the hollow space 5 as a result of the battery tipping.

Figure 2:
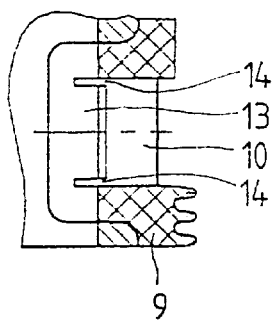
FIG. 2 shows a partial cutout from FIG. 1.

FIG. 2 shows an enlarged view of cutout II in FIG. 1. This clearly shows the arrangement of one partial membrane 13 forming flow-through gaps 14.

Figure 3:
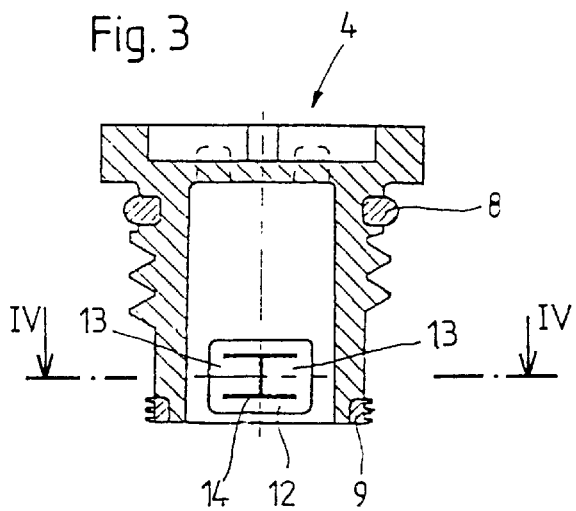
FIG. 3 shows a sectional side view of the plug in the invention.
Figure 4:
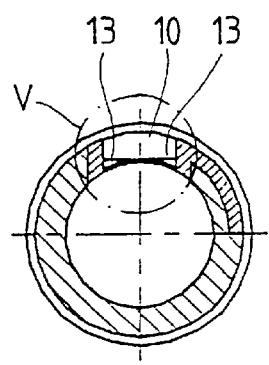
FIG. 4 shows a sectional view along cutting line IV—IV in FIG. 3.
Figure 5:
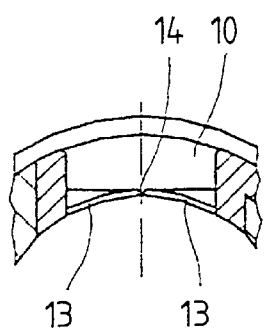
FIG. 5 shows a partial cutout from FIG. 4.

FIG. 3 shows a sectional side view of the plug 14 in the invention. Compared to the view in FIG. 1, the plug 4 in FIG. 3 is shown turned 90°. The sealed membrane 12 made up of two partial membranes 13 can be seen clearly in this figure. The two partial membranes 13 are arranged adjacent to one another in the form of sealed arms forming flow-through gaps 14. The partial membranes 13 are arranged so they can swivel here in the direction of the hollow space 5. This relationship can be inferred especially from FIG. 4 or the enlarged cutout in FIG. 5.

Figure 6:
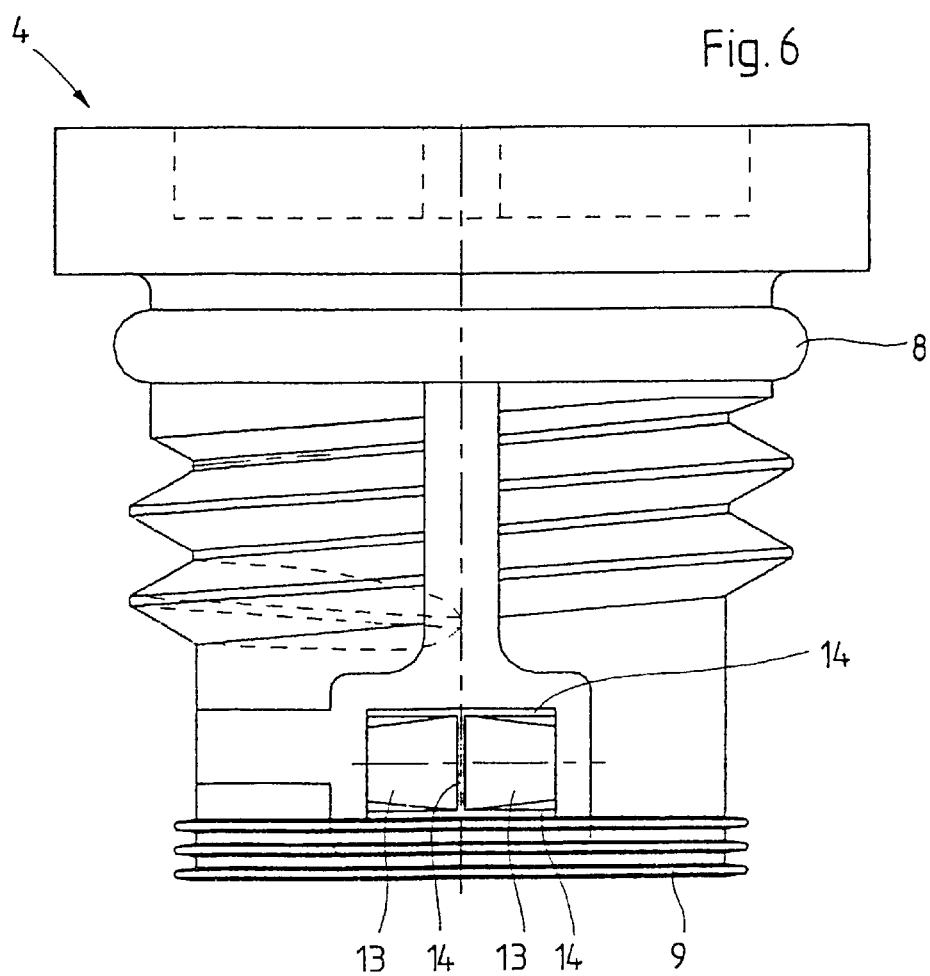
FIG. 6 shows a side view of the plug in the invention.

FIG. 6 shows the plug 4 in the invention in a side view. The round seal 8, the laminar seal 9 and the sealed membrane 12 comprised of partial membranes 13 are molded in one piece on the plug 4 and is produced in a two-component process by means of injection molding. This is especially economical to produce. It is also possible to make the plug 4 in the invention fit different storage battery designs by simple variations in the process.

LIST OF REFERENCES

1 Plug arrangement
2 Cell vent
3 Cell
4 Plug
5 Hollow space
6 Upper cover
7 Lower cover
8 Round seal
9 Laminar seal
10 Vent
11 Generating surface
12 Sealed membrane
13 Partial membrane
14 Gap
15 Access to hollow space
16 Housing
17 Cover
18 Web
19 Web
20 Acid

What is claimed is:

1. A plug arrangement for closing a cell vent of a storage battery in a gas-tight fashion, the arrangement comprising: a plug that can be used for a seal in the cell vent, wherein an inside of the cell is connected by fluid mechanics to a hollow space made between upper and lower covers of a housing cover for acid deposition through a plug vent in a generating surface of the plug that has a two-way scaled membrane.

2. The plug arrangement in claim 1, wherein the two-way sealed membrane has a break-out on at least one place forming a vent.

3. The plug arrangement in claim 2, wherein the break-out is a gap.

4. The plug arrangement in claim 1, the scaled membrane is made up of two flexible partial membranes side that form at least one gap.

5. The plug arrangement in claim 4, wherein the partial membranes are arranged so they can swivel in the direction of the hollow space.

6. The plug arrangement in claim 1, wherein the plug vent made in the generating surface of the plug is arranged opposite an access to the hollow space on the plug used in the cell vent.

7. The plug arrangement in claim 1, wherein the plug further comprises a rotating seal on a top, that, in the plug used in the cell vent in an area of the upper cover bears down on a wall surrounding the cell vent to seal the cell vent and seals the hollow space opposite air surrounding the storage battery.

8. The plug arrangement in claim 7, wherein the rotating seal is a round seal.

9. The plug arrangement in claim 1, wherein the plug further comprises a rotating seal on a foot, which bears down on a wall surrounding the cell vent to seal the cell vent in an area of the lower cover on the plug used in the cell vent and seals the hollow space opposite the inside of the cells.

10. The plug arrangement in claim 9, wherein the rotating seal is a laminar seal.

11. The plug arrangement in claim 10, wherein the laminar seal adapted to equalize tolerances between the lower cover and the upper cover.

12. The plug arrangement in claim 1, wherein the rotating seal is designed in one piece on the plug.

13. The plug arrangement in claim 8, wherein the round seal is an O ring.

14. The plug arrangement in claim 10, wherein laminar seal is designed in one piece on the plug.

* * * * *